United States Patent
Shah et al.

(10) Patent No.: US 6,381,560 B1
(45) Date of Patent: Apr. 30, 2002

(54) METHODS OF MODELING ERBIUM DOPED FIBER AMPLIFIERS

(75) Inventors: Virendra S Shah, Edison; Atul Kumar Srivastava, Eatontown; James William Sulhoff, Ocean; Yan Sun; Liyan Zhang, both of Middletown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/457,966

(22) Filed: Dec. 9, 1999

(51) Int. Cl.[7] .................................... G16F 17/50
(52) U.S. Cl. ...................... 703/2; 359/341; 385/37
(58) Field of Search ...................... 703/2; 359/341, 359/134; 385/24, 37

(56) References Cited

U.S. PATENT DOCUMENTS

| | | | | |
|---|---|---|---|---|
| 5,764,406 A | * | 6/1998 | Newhouse et al. | 359/341 |
| 5,872,650 A | * | 2/1999 | Lee et al. | 359/341 |
| 5,923,462 A | * | 7/1999 | Van Der Platts | 359/341 |
| 6,043,928 A | * | 3/2000 | Walker et al. | 359/337 |
| 6,118,523 A | * | 9/2000 | Brener et al. | 356/73.1 |
| 6,222,962 B1 | * | 4/2001 | Nilsson et al. | 385/37 |

* cited by examiner

Primary Examiner—Kevin J. Teska
Assistant Examiner—T. Phan
(74) Attorney, Agent, or Firm—Cohen Pontani Lieberman & Pavane

(57) ABSTRACT

A method of modeling erbium doped fiber ("EDF") for use in erbium doped fiber amplifiers ("EDFA"). The EDF has a length and a fractional population density of erbium ions in an excited state. Since the EDF supports N channels, the power propagation along the EDF is characterized by N+1 differential equations as a function of the direction of propagation, z, of the channels along the length l of the EDF and the time t. By applying an average inversion model to a spatially averaged inversion level of the erbium ions in the fiber, the N+1 partial differential equations are reduced to a single ordinary differential equation. This allows an analytical solution at the boundary and initial conditions of the fiber so that an expression for the power of the signal propagating along the fiber can be obtained. With this expression, the single equation can be solved analytically for the inversion level at any point along the EDF.

16 Claims, 2 Drawing Sheets

METHODS OF MODELING ERBIUM DOPED FIBER AMPLIFIERS

BACKGROUND OF THE INVENTION

1. Field of the Invention

This invention relates generally to methods of characterizing and modeling erbium doped fiber amplifiers (EDFA). More specifically, this invention relates to methods for modeling EDFA having erbium doped fiber (EDF) sections of arbitrary length using a general purpose digital computer to determine at least the average inversion level and output power of the EDFA.

2. Description of the Related Art

Fiber optic communication methods and hardware have become ubiquitous in our modem age for transporting large amounts of data from one location to another. Fiber optics utilize a light wave as a carrier signal and a modulated light signal to transport the particular information or data to be sent and received. Fiber optic communication systems typically utilize a coherent light source, such as a laser, to provide the carrier and modulation frequencies.

Fiberoptic communication also allows for efficient multiplexing of signals. Multiplexing refers to techniques that are used to pack more information down the single fiber or "pipe" by simultaneously transmitting several signals over the same pipe. Each signal is uniquely tagged so that the receiver can recognize the different signals. One important and frequently implemented multiplexing technique is called "wavelength-division multiplexing" (WDM), which accomplishes this result by delivering each such signal on a slightly different laser frequency that is detected by the receiver. Each slightly different frequency signal is called a "channel."

The challenge in current fiber optic communication systems is to efficiently implement multi-channel, high data rate and/or long distance systems. In long distance systems (sometimes referred to as "long haul systems") and high data rate systems, it is often a challenge to maintain the modulated signals' integrity because the silica or glass that makes up the fiber optic pipe exhibits high loss and high dispersion characteristics at the wavelength of the light source. The optical properties of silica pipes require that long haul and/or high data rate systems operate at between 1.33 and 1.55 $\mu$m. Moreover, the critical challenge for long haul fiber optic communications over distances of more than 100 km is how to efficiently and effectively amplify the optical signals. Typically, repeaters placed at regular intervals along the fiber link have been used to amplify the signals. Repeaters are electrooptic devices that first convert the attenuated light into an electrical signal that is then amplified and regenerated. A diode laser in the repeater transforms the electrical signal back into light for further transmission down the fiber. The problem with repeaters is that their complex circuitry fixes the electronic speed of each device, making upgrades difficult and costly. Repeaters also tend to complicate WDM systems and increase their cost because the channels must be amplified one at a time.

In the middle 1980's, researchers at the University of Southampton (Southampton, England) developed an all-optical way to amplify the 1.55 $\mu$m light in long haul fiberoptic systems. Recognizing that the rare earth element erbium exhibits good metastable states at the appropriate frequencies, they doped a three meter long silica fiber core with erbium and optically pumped it at 650 nm. In this fashion they were able to generate 125 dB of gain for a 1.53 $\mu$m signal. This was the first EDFA which today has become the optical amplifier of choice especially in all-optical, terrestrial and transoceanic fiber links.

Commercial EDFAs are typically end-pumped by a semiconductor laser at either 980 or 1480 nm. The pump radiation is introduced to the core by a dichroic coupler (a beam splitter), leaving the signal and pump waves to travel through the core together. Because the narrow core keeps the pump radiation concentrated in a small volume, it takes only a few milliwatts of pump power to generate good gain at the signal wavelength. To avoid unwanted resonance absorption of the signal by unexcited erbium atoms, the entire length of the doped fiber through which the signal travels must be pumped.

Various methods have been developed in the past in attempts to analyze the gain, output power, amplified spontaneous emission, noise figures and other parameters of EDF in order to characterize EDFAs and produce better devices. Recently, an "average inversion model" has been proposed which investigates the average inversion level of erbium atoms over a length of EDF to characterize the EDF. See Y. Sun et al., "Average Inversion Level, Modeling and Physics of Erbium-Doped Fiber Amplifiers", IEEE J. STQE, Vol. 3, No. 4, pp. 991–1007 (1997). Many other models have been proposed for investigating EDF, all of which require rigorous solutions to multi-variable partial differential equations which do not result in exact expressions, and which are computationally complex so that the models require advanced computers and a lot of processor time to solve. Moreover, as the need has evolved for ever increased bandwidth, the number of channels sent through the pipe has grown. This need has given rise to a multiplexing scheme called "dense wavelength division multiplexing" (DWDM) which has not been well defined by the current models.

There thus exist long-felt but unsolved needs in the art for models of EDF and EDFA that can accurately characterize these devices mathematically. Such models should simply explain the dynamics of the inversion population of the erbium atoms at all points in the pipe, and produce meaningful output power expressions at any point along the pipe. Additionally, the models should be computationally simple so as to not dominate computer processor time when they are being run on the computer.

SUMMARY OF THE INVENTION

The aforementioned long-felt needs are solved, and problems met, by the methods provided in accordance with the present invention. The invention comprises a model of an EDF having a length and a fractional population density of erbium ions in an excited state. Since the EDF supports N channels, the power propagation along the EDF is characterized by N+1 differential equations as a function of the direction of propagation, z, of the channels along the length l of the EDF and the time t. By applying an average inversion model to a spatially averaged inversion level of the erbium ions in the fiber, the N+1 partial differential equations are reduced to a single ordinary differential equation. This allows an analytical solution at the boundary and initial conditions of the fiber so that an expression for the power of the signal propagating along the fiber can be obtained. With this expression, the single equation can be solved analytically for the inversion level at any point along the EDF. The inventive model provides solutions to the inversion level and therefore many other useful parameters can be obtained for both the steady state and time-dependent cases.

These and other features of the present invention will become apparent from the following detailed description considered in conjunction with the accompanying drawings. It is to be understood, however, that the drawings are designed solely for purposes of illustration and not as a definition of the invention, for which reference should be made to the appended claims.

BRIEF DESCRIPTION OF THE DRAWINGS

In the drawings, wherein like reference characters identify like elements throughout the several views thereof.

DETAILED DESCRIPTION OF THE PRESENTLY PREFERRED EMBODIMENTS

Figure 1:
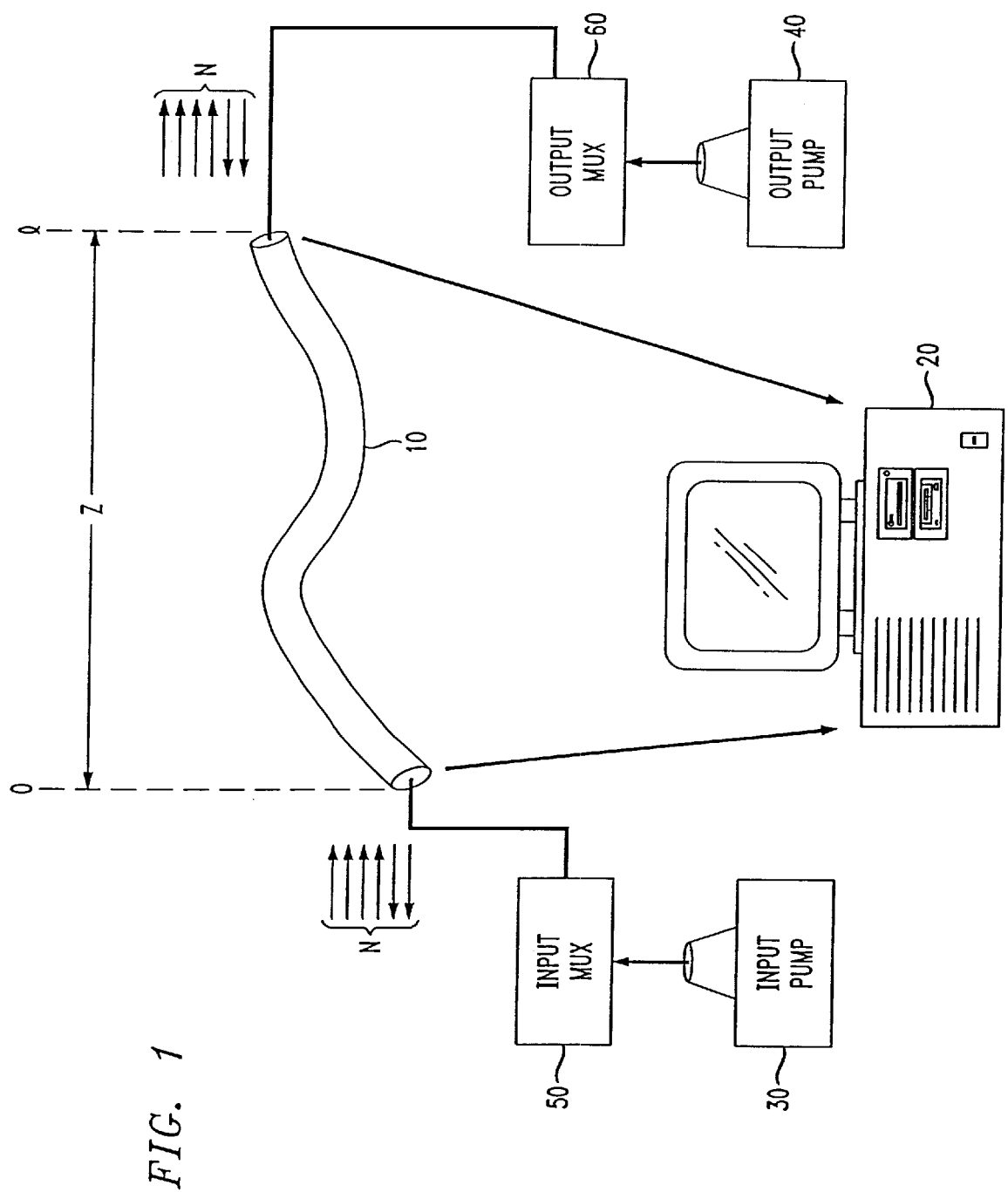
FIG. 1 is a block diagram of an EDFA which can be modeled by methods provided in accordance with the present invention.

Referring now to FIG. 1, a section of EDF 10 will in the following description and by way of illustrative example be modeled in accordance with the invention using a general purpose digital computer 20. EDF section 10 has a fixed length l which will allow propagation of a plurality of channels N in the direction z of length l. In order to model EDF 10, it is assumed that EDF 10 is pumped with an input coherent source 30, such as a laser, at a first wavelength, and is pumped at the output with an output coherent source 40, such as a laser, at a second frequency. At the transmitter side, an input multiplexer 50 multiplexes the input pumped laser signal to create the N channels and, on the output side, an output multiplexer 60 performs a similar function. The multiplexing may be WDM, DWDM, or any particular multiplexing scheme as appropriate or desired.

EDF 10 comprises a silica fiber which has a core that is doped with erbium atoms that maintain a metastable state when pumped by the lasers 30, 40. Since a metastable state is achieved, the erbium ions will lase and thereby produce the desired gain in the signal channels along the length l of the EDF. By modeling the inversion of the metastable erbium ions in accordance with the present invention, the EDF can be fully and accurately characterized. It should be noted that although the inversion model of the present invention has been developed particularly with respect to EDF, other rare earth elements such, for example, as praseodymium and neodymium may also or alternately be used as dopants in fiber optic elements and modeled by the inventive methods. Additionally, other than silica substrates may form the fiber optic elements that can be so modeled. All of these fiber optic elements, dopants, combinations thereof, and equivalents thereof are within the scope of the inventive modeling techniques taught and described herein. Throughout this disclosure the inventive modeling techniques will be described by way of example with respect to EDF.

The inventive methods begin with the "average inversion model" (AIM) mentioned above in which the normalized population density of erbium ions in the excited state averaged along the EDF is investigated. In the time-dependent AIM model, the governing equations of signal propagation and amplification along the EDF, comprising a set of partial differential equations ("PDEs"), are reduced to one ordinary differential equation ("ODE") for the average inversion level. This single-equation model, as compared with previous models, is not only elegant in that a clearly defined physical parameter (the average inversion level) is subjected to direct study, but is also fundamental in pointing out unequivocally that the average inversion level dictates the characteristics of EDFAs. The AIM model can be used to analyze and computer simulate EDFA's properties including ASE and noise figures in their steady states, transient states and perturbation responses also. However, AIM cannot characterize the amplified-spontaneous-emission (ASE), thus the noise figure of EDFAs. In the past, to determine the ASE and the noise figure of EDFAs, resort was had to prior rigorous theoretical models that are very complicated and very time consuming for computer simulations.

In accordance with the present invention, AIM is extended and generalized so that the erbium ions' inversion level temporal evolution and distribution along the fiber are characterized. Much more detailed information about the EDFA operation can thus be recovered by the inventive model as compared to the AIM model.

In the model illustrated by FIG. 1, there are N optical channels including both signal channels and pump channels. Initially at time t=0, and before that, this EDFA stage is under steady state operation, i.e., the average input powers and pump powers remain constant over the time scale of interest. Then from t=0, the input optical power of some channels starts to change due, for example, to fiber cut, node failure, and network reconfiguration including channel add, drop and re-routing actions. In the present methods the ASE is sufficiently small and does not affect the EDFA dynamic operating point.

The energy level system of the erbium ions can be treated fairly accurately as a two-level system. The population density of erbium ions in the excited state along the fiber, in general, varies spatially along the EDF and also changes temporally. Let $N_2(z,t)$ be the fractional population density in the excited state normalized by the erbium ion density, which is generically called the "inversion level spatial distribution and temporal evolution", or simply the "inversion level" for short. The rate equation for erbium ions is then, $$\tau_0 \frac{\partial N_2(z,t)}{\partial t} = -N_2(z,t) - \frac{1}{\zeta} \sum_{i=1}^{N} u_i \frac{\partial P_i(z,t)}{\partial z}, \quad (1)$$

where $P_i(z,t)$ is the normalized (in units of photon numbers per unit time) signal or pump power spatial evolution along the fiber and temporal evolution for the $i_{13}$th channel, $u_i$ is the propagation vector with $u_i=+1$ for channels traveling along the z direction and $u_i=-1$ for the opposite direction, and $\zeta$ is the saturation parameter defined as $\zeta=\rho S/\tau_0$. Here, in turn, $\rho$ is the population density of active erbium ions, S is the effective cross-section of the fiber core, and $\tau_0$ is the spontaneous lifetime of the excited state which is about 10 ms in a silica host.

The signal power propagation equation along the fiber for any channel is $$\frac{\partial P_i(z,t)}{\partial z} = u_i[(\gamma_i + \alpha_i)N_2(z,t) - \alpha_i]P_i(z,t), \quad i=1,2,\ldots,N \quad (2)$$

where $\gamma_i$ and $\alpha_i$ are the emission and absorption constants of the EDF, respectively. Note that while $\gamma_i$ and $\alpha_i$ are commonly recognized as constants, they are actually functions of the optical frequency or wavelength. Eqs. (1) and (2) are a set of N+1 PDEs with N+1 variables, and therefore may be solved in general once the boundary and/or initial conditions are given. However, since the advent of DWDM, the channel number N can be very large, making it extremely computationally intensive to solve these equations directly. In the general case, the PDEs are time dependent.

AIM reduces these N+1 PDEs to a single ODE. In the general time dependent case, the spatial-averaged inversion level $\overline{N_2}(t)$ of this EDF of length l is defined as $$\overline{N_2}(t) = 1/l \int N_2(z,t) dz, \qquad (3)$$

which is still a function of time due to the input power changes and corresponding erbium ions' energy system relaxation. Then the AIM reveals that the characteristics of an EDFA are governed by the following ODE, $$\tau_0 \frac{d\overline{N_2}(t)}{dt} = -\overline{N_2}(t) - \frac{1}{l\varsigma}\sum_{i=1}^{N} P_i^{in}(t)\{e^{[(\alpha_i+\gamma_i)\overline{N_2}(t)-\alpha_i]\times l} - 1\}, \qquad (4)$$

where $\{P_i^{in}(t), i=1,2,\ldots,N\}$ are the input signal or pump powers when they enter the EDF from one end, and may be either from $\{P_i(0,t), i=1,2,\ldots,N\}$ or from $\{P^i(l,t), i=1,2,\ldots,N\}$, depending on their traveling directions, as is shown in FIG. 1.

Equation (4) can be solved numerically if the initial condition $\overline{N_2}(0)$ is given or found. As shown in the AIM, or the inventive inversion model "IM", for the steady-state case at t=0, the initial average inversion level $\overline{N_2}(0)$ can be readily found numerically from a transcendental equation. Then, by solving Eq. (4) as an initial condition problem for the average inversion level $\overline{N_2}(t)$, the signal gain (or loss) evolution of any channel is given by $$G_i(t) = \exp\{[(\alpha_i+\gamma_i)\overline{N_2}(t)-\alpha_i]\times l\}, \ i=1,2,\ldots,N, \qquad (5)$$

and the output power is $$P_i^{out}(t) = P_i^{in}(t)\exp\{[(\alpha_i+\gamma_i)\overline{N}(t)-\alpha_i]\times l\}, \ i=1,2,\ldots,N. \qquad (6)$$

Thus after applying the AIM, Eq. (4), once over the whole EDF fiber, the output power temporal evolution $\{P_i^{out}(t), i=1,2,\ldots,N\}$ are known. This is the gist of the AIM and most of the EDFA characteristics can be explained forthwith. If the input and output powers are regrouped, then the power temporal evolution at both ends of the EDF is known from, $$\{P_i(0,t), i=1,2,\ldots,N\}, \text{ and } \{P_i(l,t), i=1,2,\ldots,N\}. \qquad (7)$$

Generally speaking, there is no analytical solution for Eq. (4). However, for small perturbations of the average inversion level (input power perturbations do not have to be small, though, as will be seen shortly) there exists a simple and very useful analytical solution. Assume that $$\overline{N_2}(t) = \overline{N_2}(0) + \delta(t) \qquad (8)$$

and $$(\alpha_i+\gamma_i)\delta(t)\times l << 1, \qquad (9)$$

which corresponds to a gain perturbation smaller than 4.34 dB for every channel, i.e.

$$\delta G_i(dB) = (10 \times Log_{10}e)(\alpha_i+\gamma_i)\delta(t)l << 4.34 \text{ dB}, \ i=1,2,\ldots,N. \qquad (10)$$

Then, by using the small variable approximation $e^x \approx 1+x$, Eq. (4), becomes $$\tau_0 \frac{d\delta(t)}{dt} \cong -\overline{N_2}(0) - \frac{1}{l\varsigma}\sum_{i=1}^{N} P_i^{in}(t)[G_i(0)-1] - \qquad (11)$$

-continued $$\delta(t)\left[1 + \frac{1}{\varsigma}\sum_{i=1}^{N} P_i^{in}(t)G_i(0)(\alpha_i+\gamma_i)\right],$$

with the initial average inversion level $\overline{N_2}(0)$ determined by $$\overline{N_2}(0) + \frac{1}{l\varsigma}\sum_{i=1}^{N} P_i^{in}(0)[G_i(0)-1] = 0, \qquad (12)$$

and the initial gain as $$G_i(0) = \exp\{[(\alpha_i+\gamma_i)\overline{N_2}(0)-\alpha_i]\times l\}. \qquad (13)$$

It is useful to analyze a transient case of an EDFA in a WDM system or network in which some channels are added, dropped or lost instantaneously (i.e. in a time scale much faster than the dynamic response time of EDFA involved). The constant input power after transient is denoted as $\{P_i^{in}(a), i=1,2,\ldots,N\}$ where a indicates after. Also, the effective lifetime is denoted as $$\tau_e = \frac{\tau_0}{1 + \sum_{i=1}^{N} \frac{P_i^{out}(a)}{P_i^{IS}}}, \qquad (14)$$

where $P_i^{IS} = \varsigma/(\alpha_i+\gamma_i)$ is the intrinsic saturation power, and $P_i^{out}(a)$ is the output power immediately after transient and before the average inversion level, and thus the signal gain, starts to change, i.e.

$$P_i^{out}(a) = P_i^{in}(a)\exp\{[(\alpha_i+\gamma_i)\overline{N_2}(0)-\alpha_i]\times l\} = P_i^{in}(a)G_i(0). \qquad (15)$$

There accordingly exists an analytical solution for the excursion of the average inversion level for Eq. (11), in the form $$\delta(t) = -\frac{\tau_e}{\tau_0}\frac{1}{l\varsigma}\sum_{i=1}^{changed}[P_i^{in}(a) - P_i^{in}(0)][G_i(0)-1] \times \qquad (16)$$
$$(1 - e^{-t/\tau_e}),$$

or $$\delta(t) = \frac{\tau_e}{\tau_0}\frac{1}{l\varsigma}\sum_{i=1}^{changed}[P_i^{out}(0) - P_i^{out}(a) - P_i^{in}(0) + P_i^{in}(a)] \times \qquad (17)$$
$$(1 - e^{-t/\tau_e}).$$

Note that the summation is over the changed channels only. The excursions of gain and output power of each channel will then be, $$G_i(t) = G_i(0)\exp[(\alpha_i+\gamma_i)\delta(t)l], \ i=1,2,\ldots,N, \qquad (18)$$

and $$P_i^{out}(t) = P_i^{in}(a)G_i(0)\exp[(\alpha_i+\gamma_i)\delta(t)l], \ i=1,2,\ldots,N, \qquad (19)$$

respectively.

Equation (16), as an analytical solution of Eq. (4), applies whenever the perturbation of the average inversion level is small. It thus applies to two distinct cases: the initial transient phase of a large perturbation before any channel experiences a gain excursion of 4.34 dB, and the whole transient phase of a small perturbation in which the maximum gain excursion for any channel is smaller than 4.34 dB.

In the case of a small perturbation, the total excursion of the average inversion level will be $$\delta(\infty) = -\frac{\tau_e}{\tau_0}\frac{1}{l_S}\sum_{i=1}^{changed}[P_i^{in}(a) - P_i^{in}(0)] \times [G_i(0) - 1] \quad (20)$$

and, correspondingly, the final stable gain and output power can be found from Eqs. (18) and (19), respectively.

Another important application of Eq. (16) is in "channel reconfiguration" and "link control." If the changed channels are arranged in such a way that, $$\sum_{i=1}^{changed}[P_j^{in}(a) - P_i^{in}(0)] \times [G_i(0) - 1] = 0, \quad (21)$$

then ideally the perturbation of the average inversion level will disappear and therefore, the surviving or existing channels will not be affected at all and service quality will be maintained. Also, as can be seen from Eq. (16), when channels with smaller gains are added or dropped the effect on the surviving channels will be minimized.

Returning now to examine the general case in which there is no analytical solution for Eq. (4) once the boundary values of signal and pump power at the initial steady-state are known, then the basic equation, Eq. (4), of the AIM can be rewritten as $$\tau_0\frac{d\overline{N_2}(t)}{dt} = -\overline{N_2}(t) - \frac{1}{l_S}\sum_{u_i=+1}^{1...N}P_i(0,t)\{e^{[(\alpha_i+\gamma_i)\overline{N_2}(t)-\alpha_i]\times l} - 1\} - \frac{1}{l_S}\sum_{u_i=-1}^{1...N}P_i(0,t)\{1 - e^{-[(\alpha_i+\gamma_i)\overline{N_2}(t)-\alpha_i]\times l}\}. \quad (22)$$

Here the boundary values of signal powers at z=0 are used instead of the input signal powers, which allows the generalization of the AIM to arbitrary lengths of EDF fiber from z=0 to anywhere z≦l, as will be hereinafter shown. Alternatively, the boundary values at z=l may also be used.

Defining a new function, $$\overline{N_2}(z,t) = 1/z\int_0^z N_2(z',t)dz', \quad (23)$$

as the "average inversion level" over the fiber section (0,z) at time t, then the AIM should apply to this section of fiber as well such that $$\tau_0\frac{\partial \overline{N_2}(z,t)}{\partial t} = -\overline{N_2}(z,t) - \frac{1}{z_S}\sum_{u_i=+1}^{1...N}P_i(0,t)\{e^{[(\alpha_i+\gamma_i)\overline{N_2}(z,t)-\alpha_i]\times z} - 1\} - \frac{1}{z_S}\sum_{u_i=-1}^{1...N}P_i(0,t)\{1 - e^{-[(\alpha_i+\gamma_i)\overline{N_2}(z,t)-\alpha_i]\times z}\}. \quad (24)$$

By solving Eq. (24) for $\overline{N_2}(z,t)$, the average inversion level over length z, on a preset grid of lengths over (0,l) with desired spatial accuracy, the spatial distribution and temporal evolution of the inversion level $N_2(z,t)$ can be found from the relationship $$N_2(z,t) = \overline{N_2}(z,t) + z\frac{\partial \overline{N_2}(z,t)}{\partial z}. \quad (25)$$

The spatial evolution of the signal power for each individual channel at any time t, $P_i(z,t)$, can now be found directly, without solving Eq. (2), by taking advantage of the newly defined function $\overline{N_2}(z,t)$ whose numerical values are available in the process of obtaining $N_2(z,t)$. They are $$P_i(z,t)=P_i(0,t)\exp\{[(\alpha_i+\gamma_i)\overline{N_2}(z,t)-\alpha_i]\times z\}, u_i=+1 \quad (26)$$

for the forward propagating channels, or $$P_i(z,t)=P_i(0,t)\exp\{-[(\alpha_i+\gamma_i)\overline{N_2}(z,t)-\alpha_i]\times z\}, u_i=-1 \quad (27)$$

for the backward propagating channels.

In the original formulation of the AIM, ASE is assumed to be weak enough so that it does not affect the operating point or dynamics of the optical amplifiers. In the inventive IM, the same assumption of weak ASE is maintained. Since the inversion level $N_2(z,t)$ and the newly defined function $\overline{N_2}(z,t)$ are known, it is now possible to observe the ASE power evolution along the EDF and recover the ASE output power in a much simpler manner than solving its propagation-amplification equations.

Consider an infinitely short section of EDF located at (z', z'+dz'); the forward propagating ASE power generated locally there at time t is $$dP_{ASE}(v,z',t) \approx 2\gamma N_2(z',t)dz'\Delta v. \quad (28)$$

The ASE power at any point z along the EDF is $$P_{ASE}(v,z,t) = \int_f^z dP_{ASE}(v,z',t)G_v(z',z,t), \quad (29)$$

where $G_v(z',z,t)$ is the optical gain from z' to z, at time t, and is given by $$G_v(z',z,t)=G_v(z,t)G_v(z',t), \quad (30)$$

and where the gain $G_v(z,t)$ is already implied in Eq. (26), and can be expressed explicitly as $$G_v(z,t)=\exp\{[(\alpha_v+\gamma_v)\overline{N_2}(z,t)-\alpha_v]\times z\}. \quad (31)$$

Therefore, by substituting Eqs. (28), (30) and (33) into Eq. (29), the analytic expression of the ASE power at any point z along the EDF can be written as $$P_{ASE}(v,z,t) = 2\gamma G_v(z,t)\int_0^z \frac{N_2(z',t)}{G_v(z',t)}dz'\Delta v. \quad (32)$$

Of practical interest to EDFAs is the ASE power at the output port, $$P_{ASE}^{out}(v,t) = P_{ASE}(v,l,t) = 2\gamma G_v(l,t)\int_0^l \frac{N_2(z',t)}{G_v(z',t)}dz'\Delta v. \quad (33)$$

By introducing the ASE spectral density $S_{sp}^{out}$ for convenience, $$P_{ASE}^{out}(v,t)=S_{sp}^{out}(v,t)\Delta v, \quad (34)$$

and so $$S_{sp}^{out}(v, t) = 2\gamma G_v(l, t) \int_0^l \frac{N_2(z', t)}{G_v(z', t)} dz'. \quad (35)$$

As has been pointed out, for practical EDFAs with non-uniformly inverted EDF, the spontaneous emission factor $n_{sp}$ has no explicit expression. Since the ASE output power is $$P_{ASE}^{out}(v,t) = 2n_{sp}(v,t)[G_v(l,t)-1]hvdv, \quad (36)$$

the spontaneous emission factor can be obtained as $$n_{sp}(v, t) = \frac{S_{sp}^{out}(v, t)}{2hv[G_v(l, t) - 1]}. \quad (37)$$

The signal-to-noise-ratio (SNR) at the output of any optical amplifier will generally degrade due to the addition of ASE from the gain media. The degradation is described by the noise figure which is defined as the ratio of input SNR to output SNR, i.e.

$$F_n = \frac{(SNR)_{in}}{(SNR)_{out}}, \quad (38)$$

where $(SNR)_{in}$ is limited by the input signal shot noise.

Assuming an ideal photon detector with a responsivity of R=q/hv, where q is the electron charge and hv the photon energy, the input SNR limited by signal shot noise is $$(SNR)_{in} = \frac{(RP^{in})^2}{2q(RP^{in})\Delta f} = \frac{P^{in}}{2hv\Delta f}, \quad (39)$$

where $P^{in}$ is the input signal power and $\Delta f$ is the detector electrical bandwidth. When both the signal shot noise and the beat noise between ASE generated by the optical amplifier and the signal are included, the SNR of the output signal can be written as $$(SNR)_{out} = \frac{(RP^{out})^2}{2q(RP^{out})\Delta f + 4(RP^{out})(RS_{sp}^{out})\Delta f}, \quad (40)$$

where $P^{out}$ is the output signal power and $S_{sp}^{out}$ is the ASE spectral density from the optical amplifier.

For the noise figure calculation, it can be seen from the above relations that only the ratio of the output power to the input power, i.e. the gain, is needed, as represented by $$\frac{P_i^{out}}{P_i^{in}} = G_i(l, t) = \exp\{[(\alpha_i + \gamma_i)\overline{N}_2(l, t) - \alpha_i] \times l\}, \quad (41)$$

$$i = 1, 2, \ldots, N; v,$$

which is known. Accordingly, together with the spontaneous emission spectral density, Eq. (35), the noise figure of single-stage EDFA can be found as, $$F_n(v, t) = \frac{1}{G_v(l, t)} + \frac{S_{sp}^{out}(v, t)}{hvG_v(l, t)}, \quad (42)$$

where the frequency dependency of the gain and noise figure are spelled out explicitly.

The EDFA is said to be undergoing "steady state" operation when the signal powers and pump powers remain constant when averaged on a time scale much longer than the bit-slot of the optical carrier. As with the more general, time-dependent case discussed above, it is assumed that the ASE does not affect the EDFA operating point, which is the case for most amplifier applications.

At steady state operation, the change in rate as a function of time is zero so that equation (1), the rate equation for the fractional population density of erbium ions in the excited state along the fiber, $N_2(z)$, becomes $$N_2(z) = -\frac{1}{\varsigma} \sum_{i=1}^{N} u_i \frac{dP_i(z)}{dz}. \quad (43)$$

Thus, Eq. (2) the signal power propagation-amplification equation for the i-th channel, is now $$\frac{dP_i(z)}{dz} = u_i[(\gamma_i + \alpha_i)N_2(z) - \alpha_i]P_i(z), \quad i = 1, 2, \ldots, N, \quad (44)$$

and the average inversion level $\overline{N}_2$ of this erbium-fiber of length l, is now $$\overline{N}_2 = 1/l \int_0^l N_2(z) dz. \quad (45)$$

The AIM now reveals that the characteristics of EDFA at steady state operation are governed by the following transcendental equation (rather than the ODE of Eq. 4 for the time-dependent case):

$$\overline{N}_2 = -\frac{1}{l\varsigma} \sum_{i=1}^{N} P_i^{in}\{e^{[(\alpha_i+\gamma_i)\overline{N}_2-\alpha_i]\times l} - 1\}. \quad (46)$$

Once this transcendental equation is solved for the average inversion level $\overline{N}_2$, the gain or loss of each channel is given by $$G_i = \exp\{[(\alpha_i+\gamma_i)\overline{N}_2-\alpha_i]\times l\} \, i=1,2,\ldots,N, \quad (47)$$

and the output power is $$P_i^{out} = G_i P_i^{in} = P_i^{in}\exp\{[(\alpha_i+\gamma_i)\overline{N}_2-\alpha_i]\times l\}, \, i=1,2,\ldots,N. \quad (48)$$

Note that Eq. (47) applies not only to signal and pump channels, but also to any frequency, such that $$G_v = \exp\{[(\alpha_v+\gamma_v)\overline{N}_2-\alpha_v]\times l\}. \quad (47')$$

One way of solving Eq. (46) is through root-finding programs, since it can be re-arranged as $$f(\overline{N}_2) = \overline{N}_2 + \frac{1}{l\varsigma} \sum_{i=1}^{N} P_i^{in}\{e^{[(\alpha_i+\gamma_i)\overline{N}_2-\alpha_i]\times l} - 1\} = 0. \quad (49)$$

The average inversion level $\overline{N}_2$, by definition, can only be within the real value domain (0,1), and $\alpha_i$ and $\gamma_i$ are positive by their respective definitions. The end values of function $\eta(\overline{N}_2)$ are $$f(0) = 0 + \frac{1}{l\varsigma} \sum_{i=1}^{N} P_i^{in}(e^{-\alpha_i l} - 1) < 0, \quad (50)$$

and

-continued $$f(1) = 1 + \frac{1}{l\varsigma}\sum_{i=1}^{N} P_i^{in}(e^{\gamma_i l} - 1) > 1 > 0. \qquad (51)$$

The derivative of $\eta(\overline{N_2})$ within the domain (0,1) is readily obtainable using $$\frac{df(\overline{N_2})}{d\overline{N_2}} = 1 + \frac{1}{l\varsigma}\sum_{i=1}^{N} P_i^{in}(\alpha_i + \gamma_i)e^{[(\alpha_i+\gamma_i)\overline{N_2}-\alpha_i]\times l} > 1 > 0. \qquad (52)$$

Therefore, based on Eqs. (50), (51) and (52), the function $\eta(\overline{N_2})$ has only one root within the domain (0,1). In physics, the consequence of this conclusion is that once the input powers are given, the average inversion level $\overline{N_2}$ is uniquely determined and becomes a good indication of the operating point of the EDFA at steady state. Also, because of the excellent monotonic property of function $\eta(\overline{N_2})$ within the domain (0,1), plus a positive slope larger than 45 degrees on the derived value $\eta(\overline{N_2})$ vs. the average inversion level $\overline{N_2}$ as seen from Eq. (52), a simple root-finding method such as the bisection method will locate the root with little computational capacity. This conclusion has important engineering value in the computer modeling of EDFA.

In general, as mentioned hereinabove, Eq. (46) can only be solved by numerical methods. However, there are special situations in which analytical solutions may exist and be useful as well. When the average inversion level $\overline{N_2}$ is kept high in order to obtain a low noise figure, such as in the first stage of a multi-stage amplifier, an analytical approximation is possible for Eq. (46). Assuming that for all of the optical channels $i=1,2,\ldots,N$ the average inversion level is high such that $$(\alpha_i+\gamma_i)(1-\overline{N_2})\times l<<1, \qquad (53)$$

then by using $e^{-x}\approx 1-x$ for small values of x, $$\overline{N_2} \approx \frac{\frac{1}{l\varsigma}\sum_{i=1}^{N} P_i^{in}\{1-[1-(\alpha_i+\gamma_i)l]e^{\gamma_i l}\}}{1+\frac{1}{\varsigma}\sum_{i=1}^{N} P_i^{in}(\alpha_i+\gamma_i)e^{\gamma_i l}}. \qquad (54)$$

Eq. (54) applies not only in situations with high average inversion levels, but also in situations with short lengths of EDF, regardless of the actual average inversion level, so long as condition Eq. (53) is satisfied. For a very short section of fiber, Eq. (54) becomes $$\overline{N_2} \approx \frac{\frac{1}{\varsigma}\sum_{i=1}^{N} P_i^{in}\alpha_i}{1+\frac{1}{\varsigma}\sum_{i=1}^{N} P_i^{in}(\alpha_i+\gamma_i)}, \qquad (55)$$

which is essentially the l's 0_th order approximation, while Eq. (54) is the l's first order approximation for short fiber length. Equations (54) & (55) are useful in providing a quick estimation of the average inversion level before rigorous computer simulation. For example, from Eq. (55) it is evident that theoretically complete inversion cannot be achieved, even for a very short section of fiber, although in practice 980 nm pumping may achieve almost complete inversion. Also, pump channels with the emission constant γ, equal to zero, such as the 980 nm pump band, are preferable in achieving a high inversion level. In fact, Eq. (55) will become exact for any infinitely short section of EDF fiber if the input signal power $P_i^{in}$ and the average inversion level $\overline{N_2}$ take their respective local values.

Similar to the time-dependent case, in the steady state once the average inversion level $\overline{N_2}$ of the whole fiber is calculated from Eq. (46), the gain and output power for each individual channel can be obtained from Eqs. (47) and (48), respectively. That is to say, the signal powers at both ends, $\{P_i(0), i=1,2,\ldots,N\}$ and $\{P_i(l),i=1,2,\ldots,N\}$, are now known. The AIM transcendental equation, Eq. (46), may then be re-arranged as follows to use the signal powers at one end only:

$$\overline{N_2} = -\frac{1}{l\varsigma}\sum_{u_i=+1}^{1-N} P_i(0)\{e^{[(\alpha_i+\gamma_i)\overline{N_2}-\alpha_i]\times l} - 1\} - \frac{1}{l\varsigma}\sum_{u_i=-1}^{1-N} P_i(0)\{1 - e^{-[(\alpha_i+\gamma_i)\overline{N_2}-\alpha_i]\times l}\}. \qquad (56)$$

The sole solution property of this equation is the same as that of Eq. (46); therefore, the same root-finding subroutines may be used. Alternatively, the signal powers at the other end may also be used.

For the steady state, Eq. (23) reduces so that $\overline{N_2}(z)$, the average inversion level for the section of the EDF fiber from z=0 to an arbitrary point z, is $$\overline{N_2}(z)=1/z\int_0^z \overline{N_2}(z')dz. \qquad (57)$$

Note that at z=l, the value of this function becomes the average inversion level in AIM, $\overline{N_2}(l)=\overline{N_2}$, and at z=0 it degenerates to the local inversion level there, $\overline{N_2}(0)=N_2(0)$.

Note also that Eq. (56) relies only on the signal and pump powers at one end of the EDF fiber z=0. The AIM applies to the section of the EDF fiber from z=0 up to z as well, and therefore, $$\overline{N_2}(z) = -\frac{1}{z\varsigma}\sum_{u_i=+1}^{1-N} P_i(0)\{e^{[(\alpha_i+\gamma_i)\overline{N_2}(z)-\alpha_i]\times z} - 1\} - \frac{1}{z\varsigma}\sum_{u_i=-1}^{1-N} P_i(0)\{1 - e^{-[(\alpha_i+\gamma_i)\overline{N_2}(z)-\alpha_i]\times z}\}. \qquad (58)$$

Thus the AIM becomes a generalized average inversion model, or simply an IM, so termed for convenience herein. By numerically solving the transcendental equation, Eq. (58), repetitively on a uniform grid of fiber length (0,l), $\overline{N_2}(z)$ can be obtained with any desired accuracy. Therefore, in the steady state Eq. (58) becomes the fundamental equation of the IM of the present invention.

Once $\overline{N_2}(z)$, the average inversion level for the section of the EDF from z=0 to z, is known by solving Eq. (58), the gain of any forward propagating channels or ASE signals from z=0 to z are found through a generalization of Eq. (47'), i.e.

$$G_v(z)=\exp\{[(\alpha_v+\gamma_v)\overline{N_2}(z)-\alpha_v]\times z\} \qquad (59)$$

This is needed to recover the output ASE power and the noise figure of the EDFA.

The local inversion level, $\overline{N_2}(z)$, can be readily obtained by tying z to Eq. (57) and taking the derivative on both sides, i.e.;

$$N_2(z) = \overline{N}_2(z) + z\frac{d\overline{N}_2(z)}{dz}. \quad (60)$$

In prior models of EDF, signal power evolution could only be found by solving the complete set of N+1 ODEs in the steady state or N+1 PDEs in the time-dependent case together with boundary conditions, which is highly computationally intensive. In the inventive model, since the inversion level distribution $\overline{N}_2(z)$ is known, there is a direct way to obtain the signal power spatial evolution rather than by solving N initial condition problems. Recalling that in solving Eq. (58) repetitively on the spatial grid over the length of the fiber, $\overline{N}_2(z)$, the average inversion level for the arbitrary fiber section (0,z) is available numerically then the signal power evolution can be obtained directly by using $$P_i(z) = P_i(0)\exp\{[(\alpha_i + \gamma_i)\overline{N}_2(z) - \alpha_i] \times l\}, \ u_i = +1 \quad (61)$$

for the forward propagating channels, or $$P_i(z)P_i(0)\exp\{-[(\alpha_i + \gamma_i)\overline{N}_2(z) - \alpha_i] \times l\}, \ u_i = -1 \quad (62)$$

for the backward propagating channels.

An alternative way of recovering the inversion level distribution $\overline{N}_2(z)$ exists for EDFAs at steady state operation, without using Eq. (60). By substituting Eq. (44) into Eq. (43), we obtain $$N_2(z) = \frac{\frac{1}{\varsigma}\sum_{i=1}^{N} P_i(z)\alpha_i}{1 + \frac{1}{\varsigma}\sum_{i=1}^{N} P_i(z)(\alpha_i + \gamma_i)}. \quad (63)$$

This expression can also be obtained directly by applying the AIM transcendental equation, Eq. (46), to an infinitely short section of fiber located at (z,z+dz), as pointed out hereinabove in discussing Eq. (55). Since $\{P_i(z), i=1,2,\ldots,N\}$ are known from Eqs. (61) and (62), the inversion level distribution $\overline{N}_2(z)$ can be calculated directly from Eq. (63). An alternative expression for $\overline{N}_2(z)$ in terms of the commonly used "intrinsic saturation power" $P_i^{IS} = \zeta/(\alpha_i + \gamma_i)$ can be written as $$N_2(z) = \frac{\sum_{i=1}^{N} \frac{P_i(z)}{P_i^{IS}} \frac{\alpha_i}{(\alpha_i + \gamma_i)}}{1 + \sum_{i=1}^{N} \frac{P_i(z)}{P_i^{IS}}}. \quad (63')$$

It is possible in the steady state to predict the variation of the inversion level along the fiber, at least for co-pumping cases. Substituting Eq. (44) into Eq. (43) and taking the spatial derivative on both sides at the same time, we obtain $$\frac{dN_2(z)}{dz} = -\frac{1}{\varsigma}\sum_{i=1}^{N} P_i(z)(\gamma_i + \alpha_i)\frac{dN_2(z)}{dz} - \frac{1}{\varsigma}\sum_{i=1}^{N}[(\gamma_i + \alpha_i)N_2(z) - \alpha_i]\frac{dP_i(z)}{dz}. \quad (64)$$

Then, by using Eq. (44) again, we obtain $$\frac{dN_2(z)}{dz} = \frac{-\frac{1}{\varsigma}\sum_{i=1}^{N} u_i[(\gamma_i + \alpha_i)N_2(z) - \alpha_i]^2 P_i(z)}{1 + \frac{1}{\varsigma}\sum_{i=1}^{N} P_i(z)(\gamma_i + \alpha_i)}, \quad (65)$$

which gives the slope of the inversion level distribution.

If all of the signals and pumps are propagating in the forward direction, i.e. in the co-pumping case, it can be seen from Eq. (65) that, $$\frac{dN_2(z)}{dz} < 0, \quad (66)$$

since all of the propagation vectors are positive. Thus, in co-pumped EDFA the inversion level of erbium ions decreases monotonically from its value at the signal input port, $$N_2(0) = \frac{\frac{1}{\varsigma}\sum_{i=1}^{N} P_i(0)\alpha_i}{1 + \frac{1}{\varsigma}\sum_{i=1}^{N} P_i(0)(\alpha_i + \gamma_i)}, \quad (67)$$

to its value at the output port, $$N_2(l) = \frac{\frac{1}{\varsigma}\sum_{i=1}^{N} P_i(l)\alpha_i}{1 + \frac{1}{\varsigma}\sum_{i=1}^{N} P_i(l)(\alpha_i + \gamma_i)}. \quad (68)$$

That is to say $$N_2(0) > N_2(z) > N_2(l). \quad (69)$$

In this case the average inversion level also satisfies $N_2(0) > \overline{N}_2 > N_2(l)$. Based on the same analysis it can be concluded that in the co-pumped EDFA the newly defined function $\overline{N}_2(z)$ has the following relationship:

$$N_2(0) > \overline{N}_2(z) > N_2(z) > N_2(l). \text{tm } (70)$$

If any signal channel or pump channel is propagating in the backward direction, the above conclusions do not generally hold. The inversion distribution along the EDF then varies in a manner depending on the actual input signal power and directions, and can only be recovered from general numerical simulation.

Figure 2:
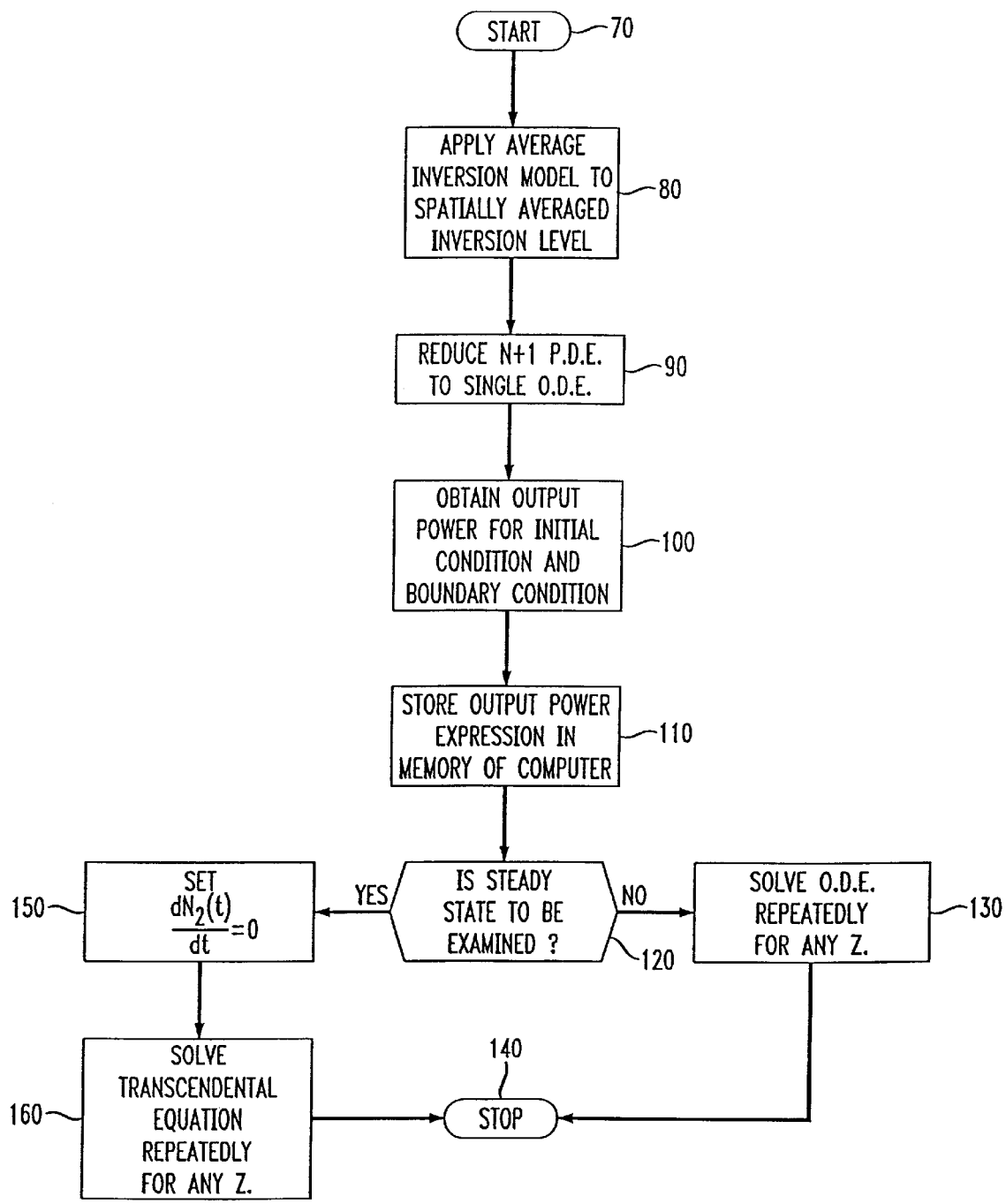
FIG. 2 is a flow chart of a method for modeling a length of EDF in accordance with the present invention.

The above-described inventive models are preferably implemented on a general purpose digital computer, such as that shown at 20 in FIG. 1 as a software-implemented method or process. Thus, appropriate software code may be written to solve the equations discussed above. FIG. 2 depicts a flow chart of a software method to solve the aforedescribed differential equations and transcendental equations in accordance with the present invention. The method begins at step 70, and at step 80 the AIM is applied to the spatially averaged inversion level of the erbium atoms in the fiber. At step 90, for the time dependent case, the N+1 PDEs are reduced to a single ODE.

At step 100, it is desired to obtain the output power for the initial and boundary conditions of the ODE. The output power expression is then stored at step 110 in a memory of computer 20. At step 120, it is determined whether the steady state is to be examined. If not, then at step 130 the ODE is repeatedly solved for any z along the length of the fiber, and the method exits at step 140. If the steady state is to be examined, then at step 150 the rate of change of the inversion level with respect to time is set to zero and the transcendental equation is then repeatedly solved at step 160 repeatedly for any z along the length l. The method then ends at step 140.

The methods for modeling EDF and EDFA in accordance with the present invention provide save computation time. These results have not heretofore been achieved in the art and will allow efficient and economical EDFAs to be designed for long haul and high data rate systems.

While there has been shown and described certain fundamental novel features of the present invention as applied to preferred embodiments thereof, it will be understood by those skilled in the art that various omissions and substitutions and changes in the devices and methods described herein, and in their operation, may be made by those with skill in the art without departing from the spirit and scope of the invention. It is expressly intended that all combinations of those elements and/or method steps which perform substantially the same function in substantially the same way to achieve the same result are within the scope of the invention. Substitutions of elements from one described embodiment to another are also fully intended and contemplated. It is the intention, therefore, to be limited only as indicated by the scope of the claims appended hereto.

We claim:

1. A method of modeling with a digital computer a section of erbium doped fiber having a length l and a fractional population density of erbium ions in an excited state due to pumping of the section of erbium doped fiber by a laser to save modeling and computation time wherein the fiber supports N optical channels such that power propagation along the fiber is characterized by N+1 differential equations as a function of a direction of propagation z of the channels along the length, comprising the steps of:

applying an average inversion model to a spatially averaged inversion level of the erbium ions in the fiber having the length l to reduce the N+1 differential equations to a single equation for the spatially averaged inversion level;

deriving an expression for output power due to pumping at a boundary condition of the fiber;

storing the derived expression for output power in a memory of the digital computer; and solving analytically in the computer the single equation for an inversion level at an arbitrary point along the direction of propagation z of the fiber having the length l using the stored output power expression.

2. The method recited in claim 1, wherein the N+1 differential equations are partial differential equations.

3. The method recited in claim 1, wherein the average inversion level of the erbium ions in the fiber is time dependent.

4. The method recited in claim 3, wherein the single equation for average inversion level comprises:

$$\tau_0 \frac{d\overline{N_2}(t)}{dt} = -\overline{N_2}(t) - \frac{1}{l\varsigma} \sum_{i=1}^{N} P_i^{in}(t) \left\{ e^{[(\alpha_i+\gamma_i)\overline{N_2}(t)-\alpha_i] \times l} - 1 \right\},$$

wherein $\overline{N_2}(t)$ is the spatially averaged inversion level, $\{P_i^{in}(t), i=1,2,\ldots,N\}$ are pump powers of spatial evolution along the fiber and temporal evolution for the i_th channel, $\varsigma$ is a saturation parameter of the fiber, $\rho$ is a population density of active erbium ions in the fiber, S is an effective cross-section of the fiber core, $\tau_0$ is a spontaneous lifetime of an excited state of the active erbium ions, $\gamma_i$ is an emission constant of the fiber, and $\alpha_i$ is an absorption constant of the fiber.

5. The method recited in claim 4, further comprising the step of determining an amplified spontaneous emission of the erbium ions in the fiber.

6. The method recited in claim 5, wherein the amplified spontaneous emission comprises:

$$P_{ASE}^{out}(v,t) = 2n_{sp}(v,t)[G_v(l,t)-1]hvdv,$$

where $n_{sp}$ is a spontaneous emission factor, $G_v(l,t)$ is an optical gain of the fiber, and v is a channel frequency.

7. The method recited in claim 1, wherein the N+1 differential equations are ordinary differential equations and the N+1 ordinary differential equations are reduced to a single transcendental equation.

8. The method recited in claim 7, wherein the transcendental equation comprises:

$$\overline{N_2} = -\frac{1}{l\varsigma} \sum_{u_i=+1}^{1-N} P_i(0) \left\{ e^{[(\alpha_i+\gamma_i)\overline{N_2}-\alpha_i] \times l} - 1 \right\} - \frac{1}{l\varsigma} \sum_{u_i=-1}^{1-N} P_i(0) \left\{ 1 - e^{-[(\alpha_i+\gamma_i)\overline{N_2}-\alpha_i] \times l} \right\},$$

wherein $\overline{N_2}$ is the spatially averaged inversion level, $\{P_i(0), i=1,2,\ldots,N\}$ are pump powers of spatial evolution along the fiber and temporal evolution for the i_th channel, $\varsigma$ is a saturation parameter of the fiber, $\rho$ is a population density of active erbium ions in the fiber, S is an effective cross-section of the fiber core, $\tau$ is a spontaneous lifetime of an excited state of the active erbium ions, $\gamma_i$ is an emission constant of the fiber, and $\alpha_i$ is an absorption constant of the fiber.

9. A method of modeling a section of erbium doped fiber having a length l and a fractional population density of erbium ions in an excited state due to pumping of the section of erbium doped fiber by a laser to save modeling and computation time wherein the fiber supports N optical channels such that power propagation along the fiber is characterized by N+1 differential equations as a function of a direction of propagation z of the channels along the length, comprising the steps of:

applying an average inversion model to a spatially averaged inversion level of the erbium ions in the fiber having the length l to reduce the N+1 differential equations to a single equation for the spatially averaged inversion level;

deriving an expression for output power of the fiber due to pumping at a boundary condition of the fiber; and solving analytically the single equation for an inversion level at an arbitrary point along the direction of propagation z of the fiber having the length l using the derived output power expressions.

10. The method recited in claim 9, wherein the N+1 differential equations are partial differential equations.

11. The method recited in claim 9, wherein the average inversion level of the erbium ions in the fiber is time dependent.

12. The method recited in claim 11, wherein the single equation for average inversion level comprises:

$$\tau_0 \frac{d\overline{N_2}(t)}{dt} = -\overline{N_2}(t) - \frac{1}{l\varsigma} \sum_{i=1}^{N} P_i^{in}(t) \{e^{[(\alpha_i+\gamma_i)\overline{N_2}(t)-\alpha_i] \times l} - 1\},$$

wherein $\overline{N_2}(t)$ is the spatially averaged inversion level, $\{P_i^{in}(t), i=1,2,\ldots,N\}$ are pump powers of spatial evolution along the fiber and temporal evolution for the i_th channel, $\varsigma$ is a saturation parameter of the fiber, $\rho$ is a population density of active erbium ions in the fiber, S is an effective cross-section of the fiber core, $\tau_0$ is a spontaneous lifetime of an excited state of the active erbium ions, $\gamma_i$ is an emission constant of the fiber, and $\alpha_i$ is an absorption constant of the fiber.

13. The method recited in claim 12, further comprising the step of determining an amplified spontaneous emission of the erbium ions in the fiber.

14. The method recited in claim 13, wherein the amplified spontaneous emission comprises:

$$P_{ASE}^{out}(v,t) = 2n_{sp}(v,t)[(G_v(l,t)-1)]hvdv,$$

where $n_{sp}$ is a spontaneous emission factor, $G_v(l,t)$ is an optical gain of the fiber, and v is a channel frequency.

15. The method recited in claim 9, wherein the N+1 differential equations are ordinary differential equations and the N+1 ordinary differential equations are reduced to a single transcendental equation.

16. The method recited in claim 15, wherein the transcendental equation comprises:

$$\overline{N_2} = -\frac{1}{l\varsigma} \sum_{u_i=+1}^{1-N} P_i(0) \{e^{[(\alpha_i+\gamma_i)\overline{N_2}-\alpha_i] \times l} - 1\} -$$

$$\frac{1}{l\varsigma} \sum_{u_i=-1}^{1-N} P_i(0) \{1 - e^{-[(\alpha_i+\gamma_i)\overline{N_2}-\alpha_i] \times l}\},$$

wherein $\overline{N_2}$ is the spatially averaged inversion level, $\{P_i(0), i=1,2,\ldots,N\}$ are pump powers of spatial evolution along the fiber and temporal evolution for the i_th channel, $\varsigma$ is a saturation parameter of the fiber, $\rho$ is a population density of active erbium ions in the fiber, S is an effective cross-section of the fiber core, $\tau_0$ is a spontaneous lifetime of an excited state of the active erbium ions, $\gamma_i$ is an emission constant of the fiber, and $\alpha_i$ is an absorption constant of the fiber.

* * * * *